Jan. 30, 1940.　　　B. O. SHORT　　　2,188,644
CULTIVATOR
Filed June 23, 1938
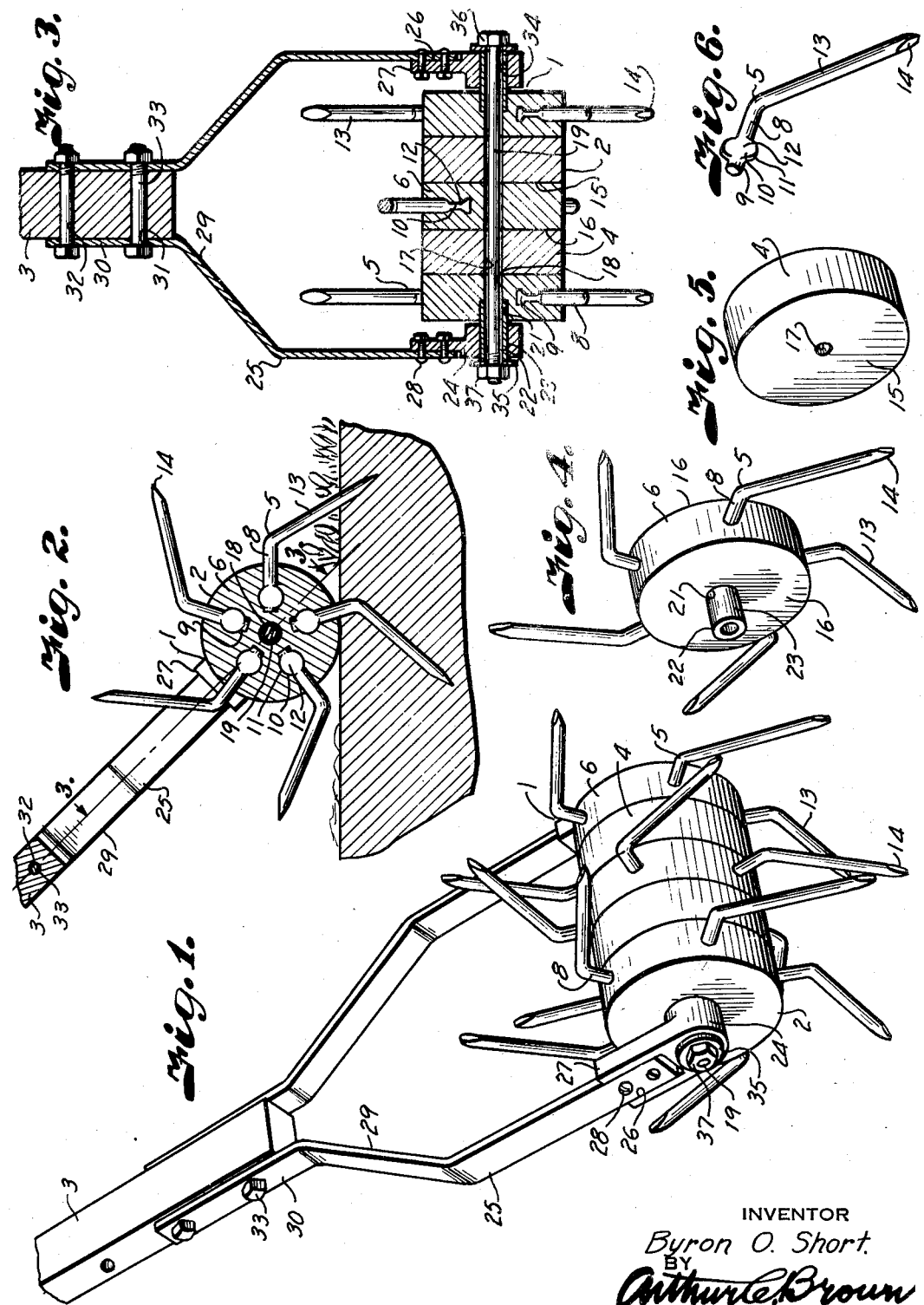
INVENTOR
Byron O. Short.
BY
Arthur L. Brown
ATTORNEY Patented Jan. 30, 1940

2,188,644

UNITED STATES PATENT OFFICE 2,188,644

CULTIVATOR

Byron O. Short, Pierce City, Mo.

Application June 23, 1938, Serial No. 215,403

4 Claims. (Cl. 97—52)

This invention relates to cultivators particularly of the type illustrated in Patent No. 2,048,-201, issued to me on July 21, 1936, and on which the present invention is an improvement, the principal object being to provide a better and more secure mounting of the cultivator teeth and tooth carrying sections.

It is also an important object of the present invention to provide a more secure and simpler assembly of the cultivator parts.

A further object of the invention is to provide a tooth shape and arrangement which more effectively cultivates the soil and which is self-cleaning upon retraction from the ground, the teeth also being shaped so that the angle of attack facilitates penetration and actuation of the cultivator.

In accomplishing these and other objects of the invention, as hereinafter pointed out, I have provided improved details of structure, the preferred form of which is illustrated in the accompanying drawing, wherein:

Fig. 1 is a perspective view of a garden cultivator embodying the features of the present invention.

Fig. 2 is a cross-sectional view through the cultivator particularly illustrating the angle of attack of the teeth and their manner of penetrating and breaking up the ground.

Fig. 3 is a section on the line 3—3 of Fig. 2, particularly illustrating the mounting of the tooth-carrying disk.

Fig. 4 is a detail perspective view of one of the tooth-carrying disks.

Fig. 5 is a perspective view of one of the spacing disks.

Fig. 6 is a detail perspective view of one of the cultivator teeth.

Referring more in detail to the drawing:

1 designates a cultivator constructed in accordance with the present invention, and which is shown as including a spiked cylinder 2 pushingly propelled by means of a handle bar 3.

The cylinder 2 includes a plurality of flat, circular disk-like sections 4, preferably formed of cast iron or equivalent material having sufficient combined weight to retain the cultivator in contact with the ground and to facilitate penetration of the teeth 5 that are carried by selected disks.

The tooth-carrying disks 6 are best illustrated in Fig. 4, and each has a plurality of teeth or spikes 5 that are cast within the metal composing the disks. The teeth or spikes 5 are preferably of round cross-section and include substantially radially extending shank portions 8, having distorted ends 9 which are imbedded within the metal and shaped to retain the shanks from radial and rotative movement. For this reason the shanks 8 are preferably flattened to provide laterally extending wing portions 10 having rounded portions 11 of greater width than the diameter of the shanks and provided with flat face portions 12 of less width to form a secure key or anchorage. The shank portions are of sufficient length to project slightly from the peripheral faces of the disks where they are bent on obtuse angles to form soil penetrating prongs 13, arranged substantially tangential to the peripheral faces of the disks as clearly shown in Fig. 2. The ends of the teeth are pointed, flattened to a chisel shape as shown at 14, or otherwise sharpened to facilitate their penetration into the ground.

Located intermediate the tooth-carrying disks are spacing disks conforming in diameter to the tooth-carrying disks. The spacing disks have flat side faces 15 adapted to engage the corresponding flat faces 16 of the tooth-carrying disks. The spacing disks also have axial openings 17 adapted to register with the axial openings 18 in the tooth-carrying disks, for passing a clamping bolt or rod as later described.

The outer faces 20 of the endmost disks are provided with axial recesses 21 into which are pressed the ends of tubular trunnions or bushings 22, having bearing portions 23 projecting therefrom to receive bearings 24 fixed to the arms 25 of the handle bar 3. The arms 25 are preferably formed of metal strap material having their ends received in sockets 26 formed on lateral extensions 27 of the bearings 24, and which are secured thereto by fastening devices, such as bolts or rivets 28. The arms have offset portions 29 terminating in handle attaching ends 30 that are provided with openings 31 registering with openings 32 in the handle bar and through which fastening devices, such as bolts 33 are extended as clearly shown in Fig. 3.

The bearings 24 have openings 34 of suitable diameter to provide rotary fit of the bushings or trunnions which are retained therein by washers 35 engaging the outer ends thereof and secured by the clamping bolt 19 having its shank extending through registering apertures of the respective disks and through the trunnions as shown in Fig. 3. The head 36 of the bolt engages against one of the washers and the nut 37 against the other to draw the washers tightly against the trunnions and to seat the opposite end of the trunnions into recesses of the outer disks, which in turn draws the faces of the respective disks in clamping contact with each other so that the cylinder is in effect a solid unit with the teeth on one disk retained in staggered relation with the teeth on the adjacent disk.

In assembling a cultivator constructed as described, a spacing disk 4 is inserted between each of the tooth carrying disks and the bushings 22 are inserted in the recesses 21 in the faces of the outer tooth-carrying disks. The bearing members of the handle bar are then inserted over the bushings or trunnions 22 and the arms which are attached thereto are connected with the handle bar 3. A washer 35 is sleeved over the shank of the clamping bolt 19 to engage the head thereof and the shank of the bolt is projected through one of the trunnions or bushings, through the axial openings 17 and 18 in the respective disks, and through the other trunnion or bushing, after which the other washer 35 is applied to the projecting end of the clamping bolt and the nut 37 is threaded thereon. The teeth are then arranged so that they are in the desired staggered relation and the nut is tightened so as to draw the parts into fixed assembly.

In using the cultivator, it is rolled over the surface of the ground so that when it is moved in a forward direction the prong portions 13 of the teeth enter the ground in substantially perpendicular position and continued movement of the cultivator causes the prongs to pry and lift the soil in the rear of the cultivator to effect breaking thereof and elevation of any roots contained in the soil, the teeth being so shaped that those entering the ground assist in forward movement of the cultivator, as well as upheaval of the soil as the teeth are withdrawn, as shown in Fig. 2.

A cultivator constructed as described is very effective for the purpose intended and may be relatively inexpensively constructed, the teeth being cast and anchored in the disks, are securely retained and are not likely to become loosened or broken.

What I claim and desire to secure by Letters Patent is:

1. In a cultivator, a cultivating element including a rotatable metallic disk having a circular peripheral face, and a plurality of teeth having shanks provided with key means imbedded in the metal of said disk and having prongs arranged at obtuse angles to said shanks, said key means being adapted to maintain said shanks immovable in the disk and projecting a fixed radial distance so that said prongs are rigidly retained substantially tangential with the peripheral face and in the plane of rotation of said disk.

2. In a cultivator, a rotating cylinder including a plurality of metal disks having substantially flat contacting side faces and circular peripheral faces, and a plurality of teeth having shanks provided with key means imbedded in the metal of selected disks and having prongs arranged at an obtuse angle to said shanks, said key means being adapted to maintain said shanks immovable in the disks and projecting a fixed radial distance from the peripheral faces so that the prongs are rigidly retained in substantially tangential relation with the peripheral faces and in the plane of rotation of the respective disks.

3. A cultivator including a plurality of cultivating elements, each including a rotatable metal disk having side faces engaging the side faces of an adjacent disk and having circular peripheral faces, said disks being provided with axial openings and the endmost disks with axial sockets registering with the axial openings therein, tubular trunnions seated in said sockets of the endmost disks, a rod-like member extending through said openings and through the tubular trunnions, washers on said rod-like member, means on the rod-like member for drawing said washers into clamping engagement with ends of the trunnions and the contacting faces of one disk into clamping engagement with the contacting faces of the adjacent disks to maintain fixed relative relation of the disks bearing said trunnions, and a handle bar yoke having arms carrying the trunnions.

4. A cultivator including a plurality of cultivating elements, each including a rotatable metal disk having side faces interengaging the side faces of an adjacent disk and circular peripheral faces, said disks being provided with axial openings, teeth carried by the selective disks and having shanks provided with key means imbedded in the metal of the respective disks and having prongs, said key means being adapted to maintain said shanks immovable in the disks and projecting a fixed radial distance so that the prongs are rigidly retained tangential to the peripheral faces and in the plane of disk rotation, tubular trunnions engaged in sockets of the endmost disks, a rod member extending through said axial openings and through the tubular trunnions, and means on the rod member and engaging the ends of the tubular trunnions for drawing said side faces into clamping frictional contact with each other to maintain fixed relative relation of the teeth on their respective disks.

BYRON O. SHORT.